(12) United States Patent
Gandara et al.

(10) Patent No.: US 11,458,559 B2
(45) Date of Patent: Oct. 4, 2022

(54) METHOD AND APPARATUS FOR ARC WELDING BY REMOTE CONTROL

(71) Applicant: DNV GL USA, Inc., Katy, TX (US)

(72) Inventors: Nickolas J. Gandara, Columbus, OH (US); William A. Bruce, Upper Arlington, OH (US)

(73) Assignee: DNV GL USA, Katy, TX (US)

( * ) Notice: Subject to any disclaimer, the term of this patent is extended or adjusted under 35 U.S.C. 154(b) by 405 days.

(21) Appl. No.: 16/655,595

(22) Filed: Oct. 17, 2019

(65) Prior Publication Data

US 2020/0122267 A1 Apr. 23, 2020

Related U.S. Application Data

(60) Provisional application No. 62/747,493, filed on Oct. 18, 2018.

(51) Int. Cl.
*B23K 9/28* (2006.01)
*B23K 9/12* (2006.01)
*B23K 9/067* (2006.01)

(52) U.S. Cl.
CPC .............. *B23K 9/28* (2013.01); *B23K 9/0671* (2013.01); *B23K 9/12* (2013.01)

(58) Field of Classification Search
CPC .......... B23K 9/28; B23K 9/282; B23K 9/287; B23K 9/0671; B23K 9/12
See application file for complete search history.

(56) References Cited

U.S. PATENT DOCUMENTS

| | | | | |
|---|---|---|---|---|
| 2,422,811 A | * | 6/1947 | Tyrner | B23K 9/147 219/124.32 |
| 2,449,677 A | * | 9/1948 | Setzler | B23K 9/147 219/124.32 |
| 2,536,999 A | * | 1/1951 | Skytte | B23K 9/147 219/124.32 |
| 2,890,323 A | * | 6/1959 | Lee | B23K 9/147 219/124.32 |
| 3,543,989 A | * | 12/1970 | Cooper | B23K 9/287 901/14 |
| 4,436,981 A | * | 3/1984 | Sakamoto | B23K 9/12 219/124.32 |
| 4,439,664 A | | 3/1984 | Toohey | |
| 4,851,639 A | * | 7/1989 | Sugitani | B23K 9/287 219/125.11 |

(Continued)

*Primary Examiner* — Brian W Jennison
(74) *Attorney, Agent, or Firm* — The Richards Law Firm LLC; William B. Richards, Esq.

(57) ABSTRACT

A welding apparatus can comprise an electrode holder configured to removably receive a consumable electrode and an actuator configured to move the electrode holder. The apparatus can comprise a base and an arm having first and second ends, where the first end is coupled to the arm such that the arm extends in a first direction that is angularly disposed relative to the base. The base can be configured to be placed relative to a workpiece such that the second end of the arm is disposed further from the workpiece than is the first end and the electrode, when received by the electrode holder, extends from the electrode holder toward the workpiece. A controller can be configured to adjust a rate at which the actuator moves the electrode holder relative to the arm, optionally based at least in part on an arc voltage measured across the electrode and the workpiece.

23 Claims, 12 Drawing Sheets

(56) References Cited

U.S. PATENT DOCUMENTS

| | | | | |
|---|---|---|---|---|
| 5,693,286 | A | * | 12/1997 | Hatanaka ............... B23K 9/287 |
| | | | | 266/67 |
| 5,893,510 | A | * | 4/1999 | Kiilunen ............ B23K 37/0235 |
| | | | | 228/45 |
| 6,737,608 | B2 | * | 5/2004 | Esslinger ............... B23K 9/126 |
| | | | | 219/125.11 |
| 2017/0028499 | A1 | * | 2/2017 | Yoshida ................... B25J 9/163 |

* cited by examiner

METHOD AND APPARATUS FOR ARC WELDING BY REMOTE CONTROL

CROSS-REFERENCE TO RELATED APPLICATION

This application claims priority to U.S. Prov. Pat. App. No. 62/747,493, filed Oct. 18, 2018, entitled "Methods and Apparatuses for Arc Welding by Remote Control", which application is incorporated herein by reference.

FIELD OF INVENTION

The present invention relates generally to arc welding and, more particularly but without limitation, to methods and apparatus for remote arc welding using an actuator.

BACKGROUND

Arc welding generally involves creating an electric arc between an electrode and a workpiece to melt the electrode and/or the workpiece such that a pool of molten metal (e.g., a weld pool) is formed. The weld pool can solidify to form a weld. Some arc welding methods, such as shielded metal arc welding, use a consumable electrode that melts as the weld is formed. Consumable electrodes can comprise a core covered by a flux coating. The coating can decompose as the electrode is consumed to emit gases that protect the weld area from atmospheric gases. The coating can also provide molten slag to the weld pool such that the molten slag floats to the surface and protects the weld from contamination as it solidifies. The slag can be chipped away from the finished weld.

Shielded metal arc welding is generally performed manually. The operator must hold the electrode with an electrode holder and maintain a proper electrode orientation as the weld advances. The quality of a weld can depend at least in part on the distance separating the electrode and the workpiece (e.g., the arc length), the angle of the electrode relative to the workpiece, the travel speed of the electrode, and/or the like. For example, if the arc length is too short, the resulting weld bead may have an uneven surface leading to cold lap or the arc can extinguish; if the arc length is too long, the resulting weld may have excessive spatter and/or porosity and the slag may be difficult to remove. Additionally, the electric arc may burn through relatively thin workpieces if improper technique is used. Weld quality is thus largely dependent on operator skill, which may limit, for example, the minimum workpiece thickness that can be welded. And, even for skilled operators, manual welding may have a low degree of weld repeatability.

Gravity welding is sometimes used as an alternative to manual welding. The electrode holder of a gravity welder is typically mounted to an inclined bar that extends over the area to be welded. The electrode can be coupled to the electrode holder such that the electrode extends toward the workpiece at an angle and, at the electrode tip, the edge of the electrode contacts the workpiece. During welding, gravity can cause the electrode to slide along the inclined bar as the electrode is consumed. To achieve a desired arc length, the edge of the electrode tip must maintain contact with the workpiece and the electrode must have a thick coating such that an appropriate distance separates a portion of the tip from the workpiece. As such, electrodes used for gravity welding must be relatively large in diameter (e.g., greater than 0.25 inches in diameter). Because larger diameter electrodes may require higher welding amperage, increasing the penetration of the electric arc, gravity welding may be unsuitable for thinner workpieces. And, successful operation of the gravity welder requires the melting rate of the electrode to match its sliding rate, which is only adjustable by changing the inclination angle of the inclined bar. Due to such limited adjustability, gravity welding may produce welds inconsistently, as with manual welding.

Current welding techniques thus may not consistently produce quality welds and may be unsuitable for welding relatively thin workpieces. The low degree of weld repeatability can pose challenges, for example, for weld experimentation, e.g., where welds are made to simulate those to be made on a high-risk workpiece (e.g., on pipes containing flammable materials). The lack of repeatability may create uncertainty regarding whether the experimental welds accurately simulate the metallurgical conditions of those to be made in the field, and thus whether the experimental weld conditions can be safely used to weld the high-risk workpiece. Conventional welding techniques also require the presence of the operator in the vicinity of the workpiece, which can pose a safety risk when welding high-risk workpieces (e.g., pipes containing flammable materials, which may inadvertently ignite). Accordingly, there is a need in the art for a welding apparatus that can produce quality welds with a high degree of repeatability while permitting an operator to be positioned remote from the workpiece.

SUMMARY

The present welding apparatuses and methods address the need in the art for weld repeatability and improved safety through the use of an actuator configured to move an electrode holder, and thus a consumable electrode coupled thereto, relative to a workpiece. The rate at which the actuator moves the electrode holder can be adjustable to compensate for the electrode consumption and thereby maintain a suitable arc length. A controller can be configured to adjust the rate at which the actuator moves the electrode holder based at least in part on the arc voltage measured across the electrode and the workpiece. Such control can provide a high degree of weld repeatability and can be achieved without the need for large diameter electrodes. And, the controller and actuator can automate the welding process such that an operator may be positioned remotely from the workpiece as it is welded. Operator safety can thereby be improved when welding high-risk workpieces.

Some of the present welding apparatuses comprise a base and, optionally, an arm having opposing first and second ends, wherein the first end is coupled to the base. In some of such apparatuses, the arm extends between the first and second ends in a first direction that is angularly disposed relative to the base. The base, in some apparatuses, is configured to be placed relative to a workpiece such that the second end of the arm is disposed further from the workpiece than is the first end.

Some apparatuses comprise an electrode holder configured to removably receive a consumable electrode. In some apparatuses, the electrode holder is coupled to the arm and, optionally, can position the electrode such that the electrode extends in a second direction that is angularly disposed relative to the base. The electrode, in some apparatuses, can extend between first and second electrode ends. Some apparatuses are configured such that, when the base is placed relative to a workpiece and the electrode is received by the electrode holder, the electrode extends from the electrode holder toward the workpiece. In some apparatuses, the electrode holder is configured to position the electrode such that the first electrode end is disposed closer to the workpiece than is the second electrode end, optionally such that the first electrode end is separated from the workpiece by an initial separation distance. In some apparatuses, the electrode holder comprises a receiver that is configured to removably receive the electrode and is pivotable such that, when the electrode is received by the receiver, an angle between the electrode and the arm is adjustable.

Some apparatuses comprise an actuator configured to move the electrode holder relative to, optionally along, the arm. In some apparatuses, the actuator is configured to move the electrode holder toward the workpiece, optionally such that, when the electrode is received by the electrode holder, the second electrode end moves toward the workpiece. The actuator, in some apparatuses, comprises a motor that optionally is coupled to the arm and a leadscrew operatively coupled to the motor and operatively coupled to the electrode holder such that, when the motor is actuated, the leadscrew rotates to move the electrode holder along the leadscrew and relative to the arm. The leadscrew, in some apparatuses, extends along the arm in the first direction. In some apparatuses, the electrode holder comprises a sliding member slidably coupled to the arm and a flange that extends outwardly from the sliding member and defines an opening. The leadscrew, in some of such apparatuses, is disposed in the opening such that, when the leadscrew rotates, the leadscrew engages and thereby moves the flange along the leadscrew to slide the sliding member along the arm.

Some apparatuses comprise a controller configured to adjust a rate at which the actuator moves the electrode holder relative to the arm, optionally at which the actuator moves the electrode holder toward the workpiece. The controller, in some apparatuses, can be configured to adjust the rate based at least in part on an arc voltage measured across the electrode and the workpiece, optionally based solely on a comparison of the arc voltage with a target voltage. In some apparatuses, the controller can be configured to adjust the rate such that, during welding, an arc length measured between the electrode and the workpiece is maintained within 10 percent of the initial separation distance. In some apparatuses, the controller is configured to adjust the rate at least by adjusting a speed at which the motor rotates the leadscrew. The controller, in some apparatuses, can be configured to detect initiation of a weld and, optionally, in response to detecting initiation of a weld, actuate the actuator and adjust the rate at which the actuator moves the electrode holder (e.g., relative to the arm and/or toward the workpiece).

In some apparatuses, the workpiece is a pipe, the base is coupled to the pipe, and the electrode is coupled to the electrode holder.

Some of the present methods comprise coupling a consumable electrode extending between first and second electrode ends to an electrode holder of a welding apparatus. Some methods comprise positioning the electrode such that the electrode extends from the electrode holder toward a workpiece, which, optionally, comprises a pipe, and the first electrode end is disposed closer to the workpiece than is the second electrode end. In some methods, positioning the electrode comprises pivoting the electrode holder such that the electrode pivots from a first position in which the electrode is angularly disposed relative to the workpiece at a first angle to a second position in which the electrode is angularly disposed relative to the workpiece at a second angle different from the first angle. Some methods comprise applying power to the electrode to initiate welding. Positioning the electrode, in some methods, is performed such that the first electrode end is separated from the workpiece by an initial separation distance.

Some methods comprise, during the welding, moving the second electrode end toward the workpiece at least by, as the electrode is consumed, actuating an actuator of the welding apparatus to move the electrode holder toward the workpiece. Some methods comprise adjusting the rate at which the actuator moves the electrode holder toward the workpiece based at least in part on an arc voltage measured across the electrode and the workpiece, optionally based solely on a comparison of the arc voltage with a target voltage. In some methods, moving the second electrode end toward the workpiece is performed such that, during the welding, an arc length measured between the electrode and the workpiece is maintained within 10% of the initial separation distance.

In some methods, the welding apparatus comprises a base and an arm extending between first and second ends, the first end coupled to the base. Some of such methods comprise positioning the base relative to the workpiece such that the arm extends in a first direction angularly disposed relative to the workpiece and the second end is disposed further from the workpiece than is the first end. In some of such methods, the actuator comprises a motor operatively coupled to the arm and a leadscrew operatively coupled to the motor and operatively coupled to the electrode holder such that the leadscrew extends along the arm in the first direction, and, optionally, actuating the actuator comprises actuating the motor such that the leadscrew rotates and thereby moves the electrode holder along the arm and the leadscrew.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any embodiment of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Further, a device or system that is configured in a certain way is configured in at least that way, but it can also be configured in other ways than those specifically described.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. Views in the figures are drawn to scale, unless otherwise noted, meaning the sizes of the depicted elements are accurate relative to each other for at least the embodiment in the view.

DETAILED DESCRIPTION OF ILLUSTRATIVE EMBODIMENTS

Figure 1:
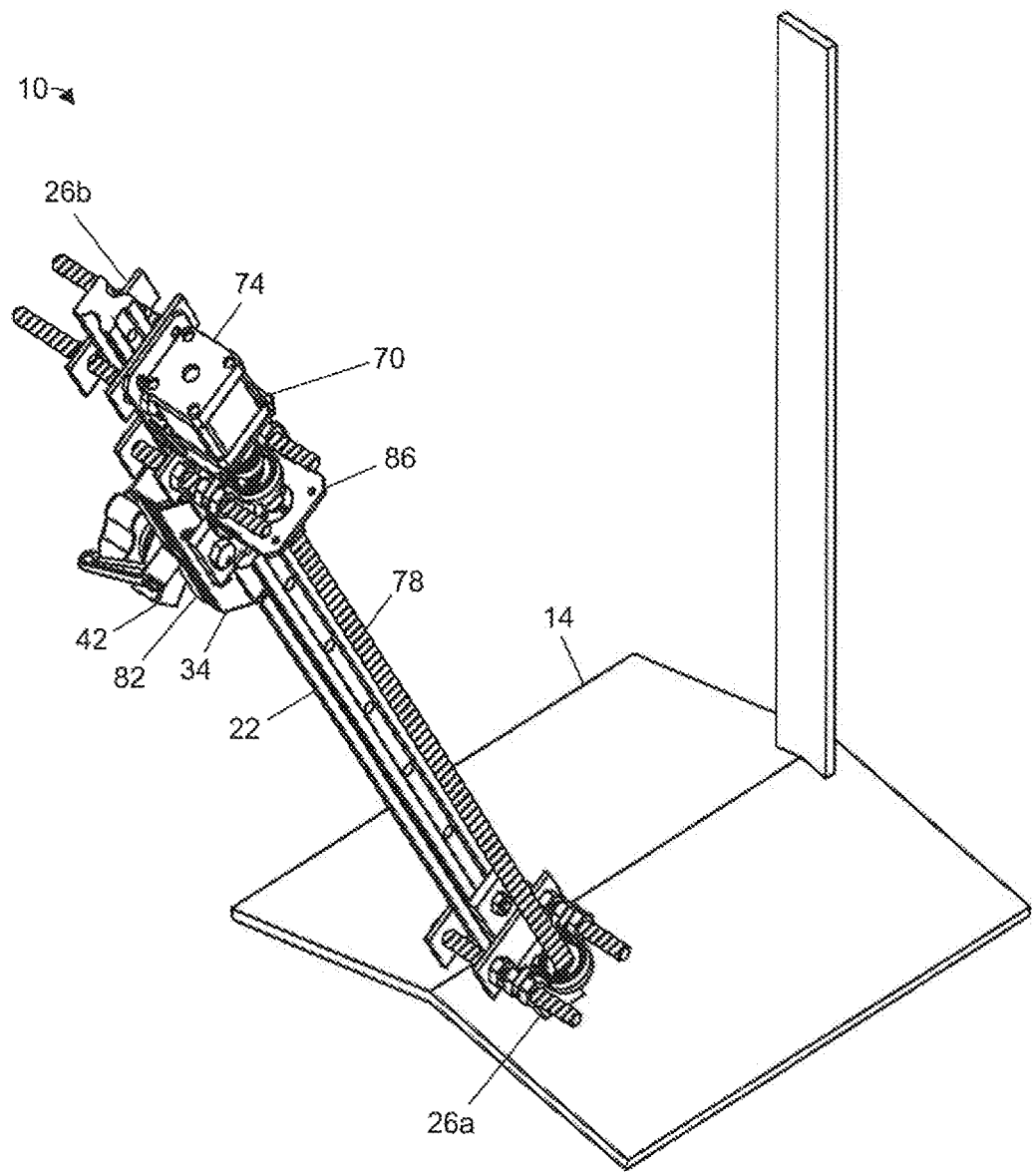
FIGS. 1 and 2 are perspective and top views, respectively, of one of the present welding apparatuses.
Figure 2:
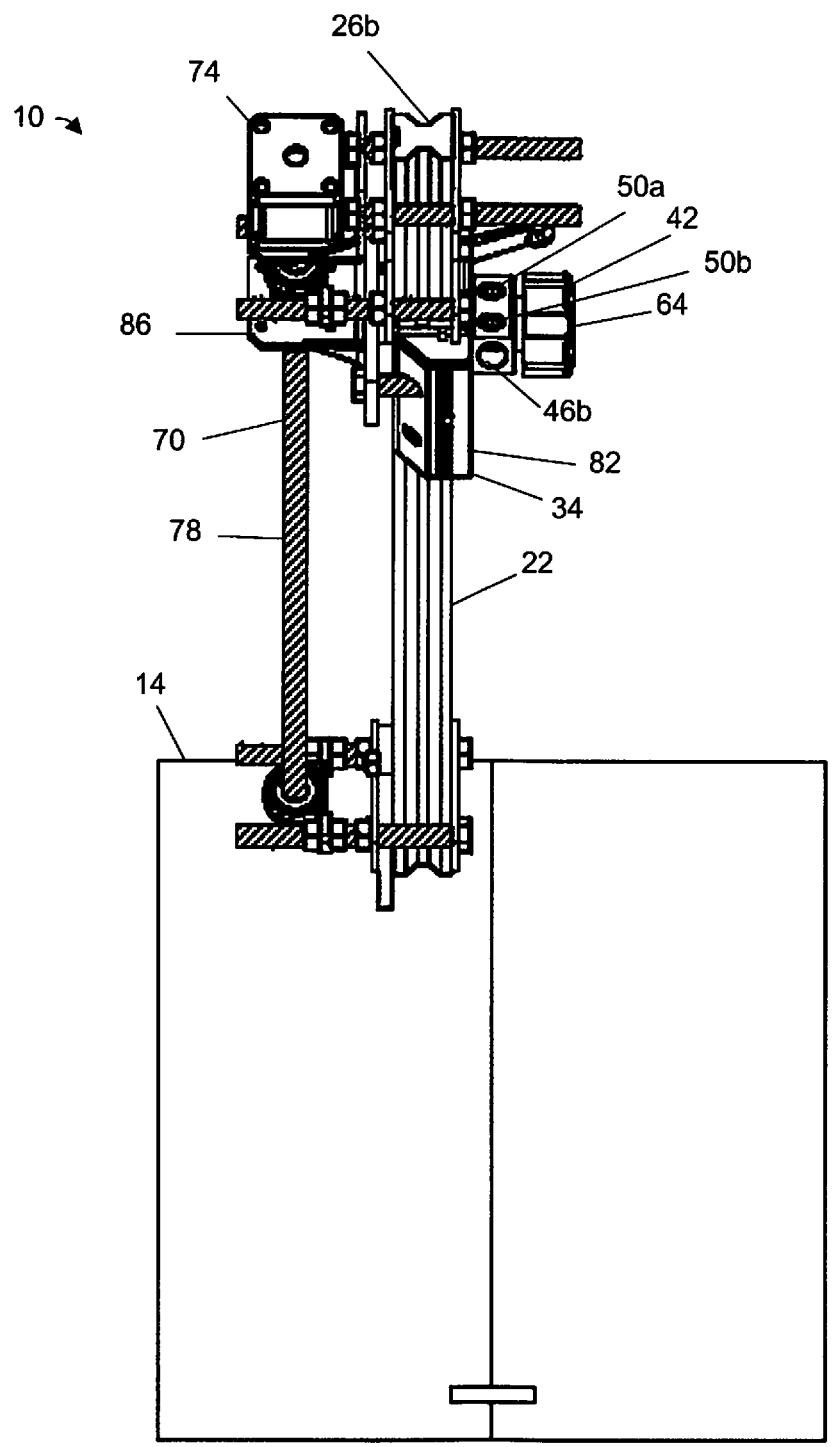
Figure 3:
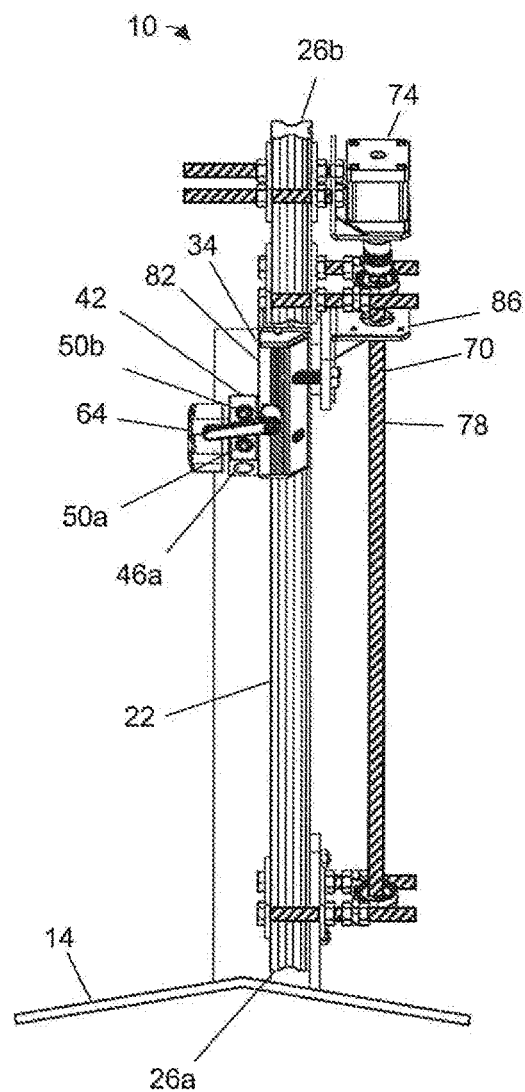
FIGS. 3 and 4 are front and rear views, respectively, of the welding apparatus of FIG. 1.
Figure 4:
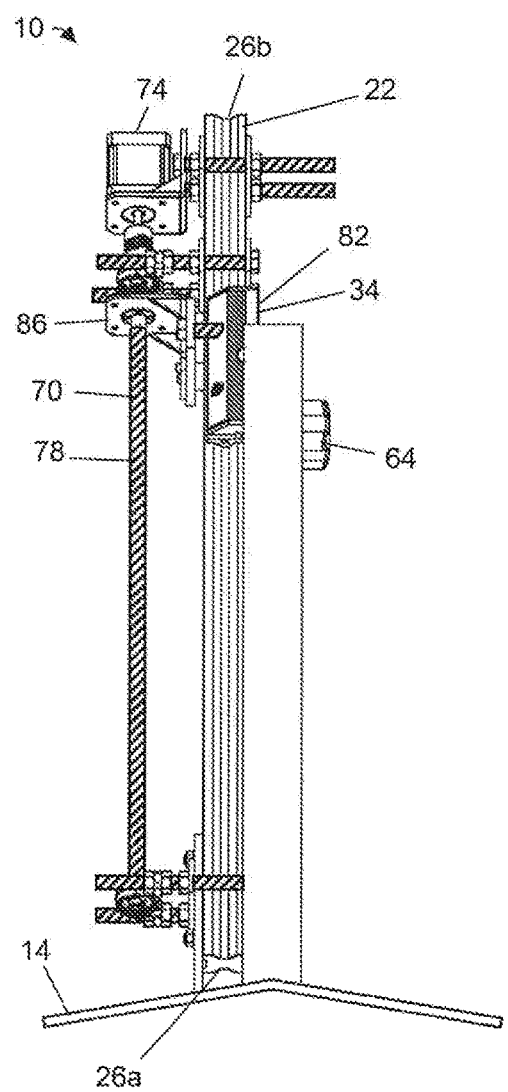

FIGS. 1-7 show an embodiment 10 of the present welding apparatuses, and FIGS. 9-12 illustrate the welding apparatus when used to weld workpiece 18. Apparatus 10 can comprise a base 14 configured to be placed relative to (e.g., coupled to) a workpiece 18 (FIG. 9) to form a weld thereon. Base 14 can be placed and/or coupled in fixed relation with workpiece 18 (e.g., as shown) or, in some embodiments, can be movable relative to the workpiece (e.g., to permit rotation about and/or translation along the workpiece). As shown, workpiece 18 is a pipe (e.g., configured to carry flammable gas and/or liquid); however, base 14 can be configured to be placed relative to and/or coupled to a wide variety of workpieces, such as, for example, automotive parts, ship- building parts, construction materials, and/or the like. Such objects can comprise a single piece or multiple pieces (e.g., to be welded together). And, while base 14 as shown is configured to be coupled to (e.g., disposed on) workpiece 18, in other embodiments the base can be configured to be placed relative to, and without being coupled to, the workpiece.

Apparatus 10 can comprise an arm 22 that has opposing first and second ends 26a and 26b. First end 26a can coupled to base 14 and arm 22 can extend away from the base in a first direction that is angularly disposed relative to the base such that, when the base is placed (e.g., coupled) relative to workpiece 18, second end 26b is disposed further from the workpiece than is the first end. For example, a minimum angle 30 between arm 22 and base 14, and thus workpiece 18, can be greater than 0°, such as, for example, greater than or equal to or between any two of 10°, 20°, 30°, 40°, 50°, 60°, 70°, 80°, or 90°. As shown, arm 22 is positioned such that second end 26b is not disposed above base 14.

Figure 9:
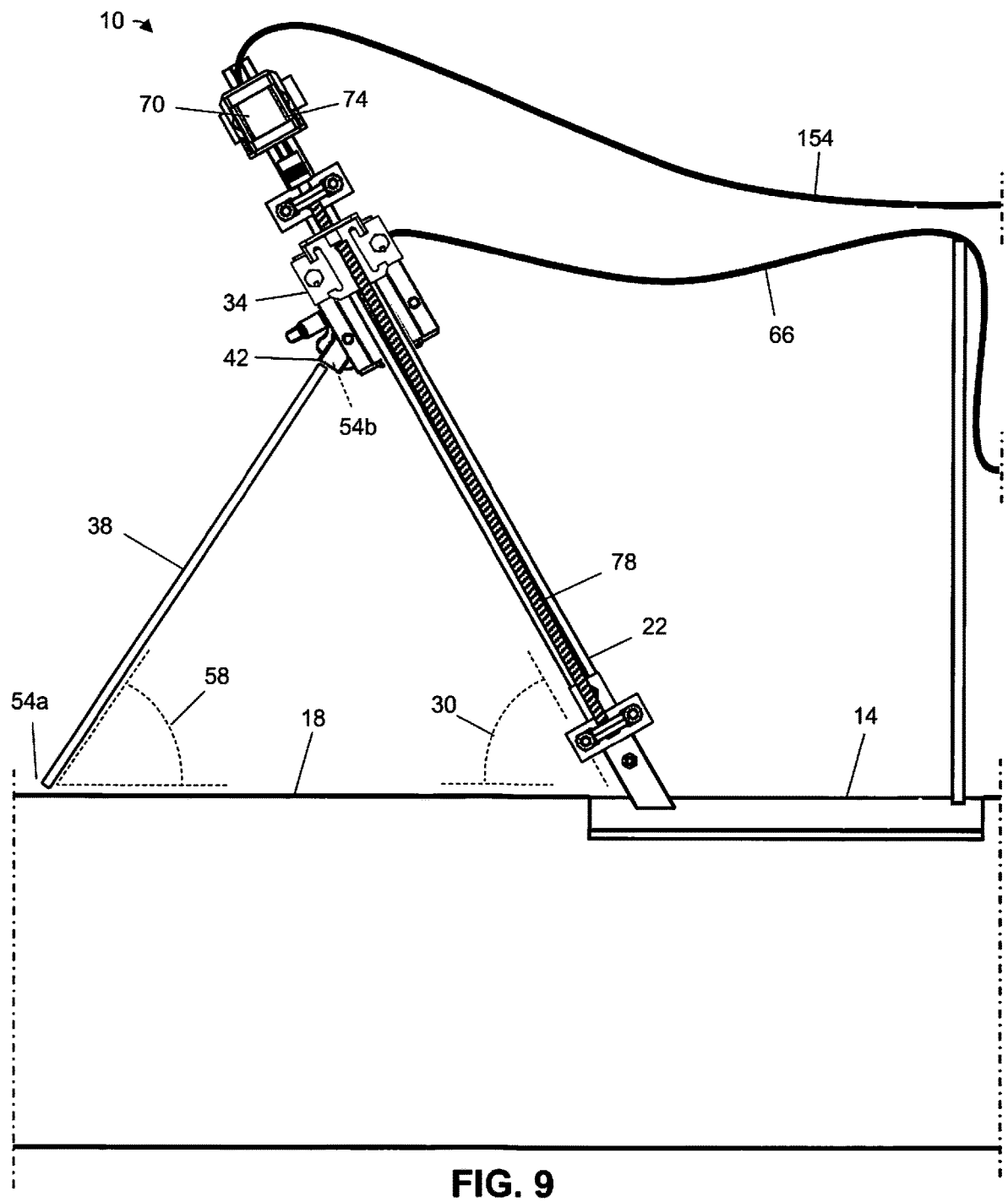
FIG. 9 is a left view of the welding apparatus of FIG. 1 during use. As shown, the electrode is coupled to the electrode holder, the base is disposed on the workpiece, a power wire is coupled to the electrode holder to deliver power to the electrode, and an umbilical is coupled to the motor for control thereof.

Apparatus 10 can comprise an electrode holder 34 configured to removably receive a consumable electrode 38 (FIG. 9). As shown, for example, electrode holder 34 can comprise a receiver 42 that defines a first receptacle 46a configured to receive electrode 38 and a first set screw 50a. When electrode 38 is received in first receptacle 46a, first set screw 50a can, when tightened, engage and thereby retain the electrode therein and, when loosened, can permit removal of the electrode. Other embodiments can use any suitable mechanism to releasably retain electrode 38 in electrode holder 34, such as, for example, one or more clamps, receptacles, set screws, and/or the like.

Electrode holder 34 can be configured to direct electrode 38 toward workpiece 18 such that the electrode can form a weld thereon. As shown, electrode 38 can extend between opposing first and second electrode ends 54a and 54b. Electrode holder 34 can receive second electrode end 54b and direct the electrode toward workpiece 18 in a second direction angularly disposed relative to the workpiece and base 14 (and, e.g., to the first direction). For example, when electrode 38 is coupled to electrode holder 34 and base 14 is positioned (e.g., coupled) relative to workpiece 18, a minimum angle 58 between the electrode and the base, and thus the workpiece, can be greater than 0°, such as, for example, greater than or equal to or between any two of 10°, 20°, 30°, 40°, 50°, 60°, 70°, 80°, or 90°. As a result, first electrode end 54a can be disposed closer to workpiece 18 than is second electrode end 54b.

Figure 5:
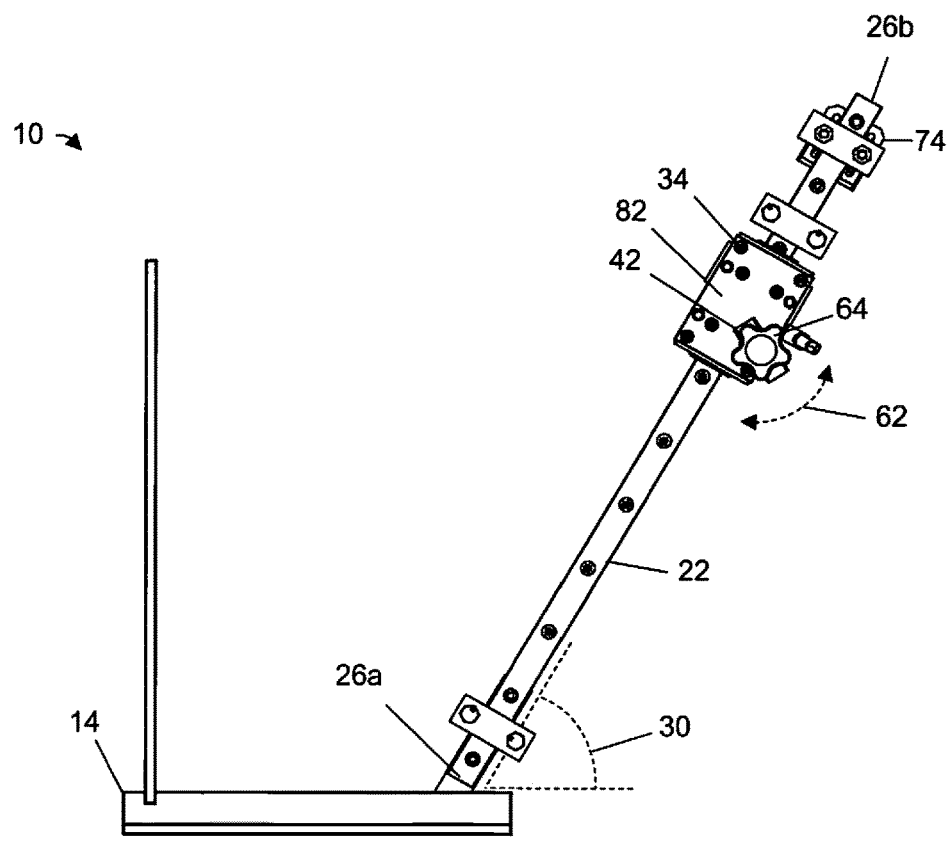
FIGS. 5 and 6 are right and left views, respectively, of the welding apparatus of FIG. 1.
Figure 6:
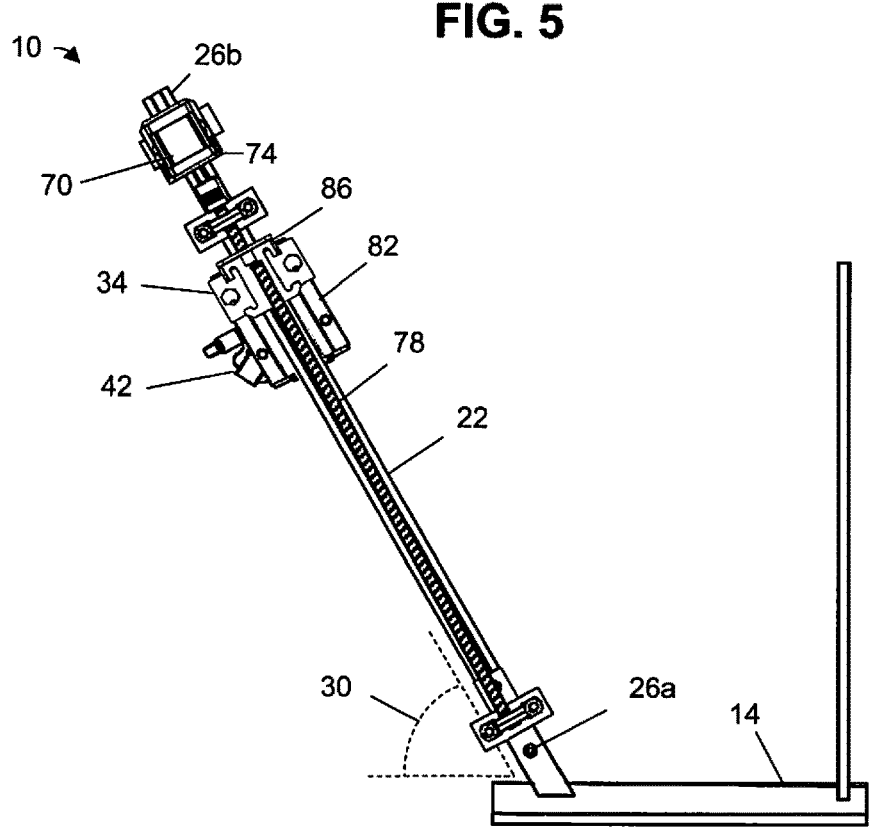
Figure 7:
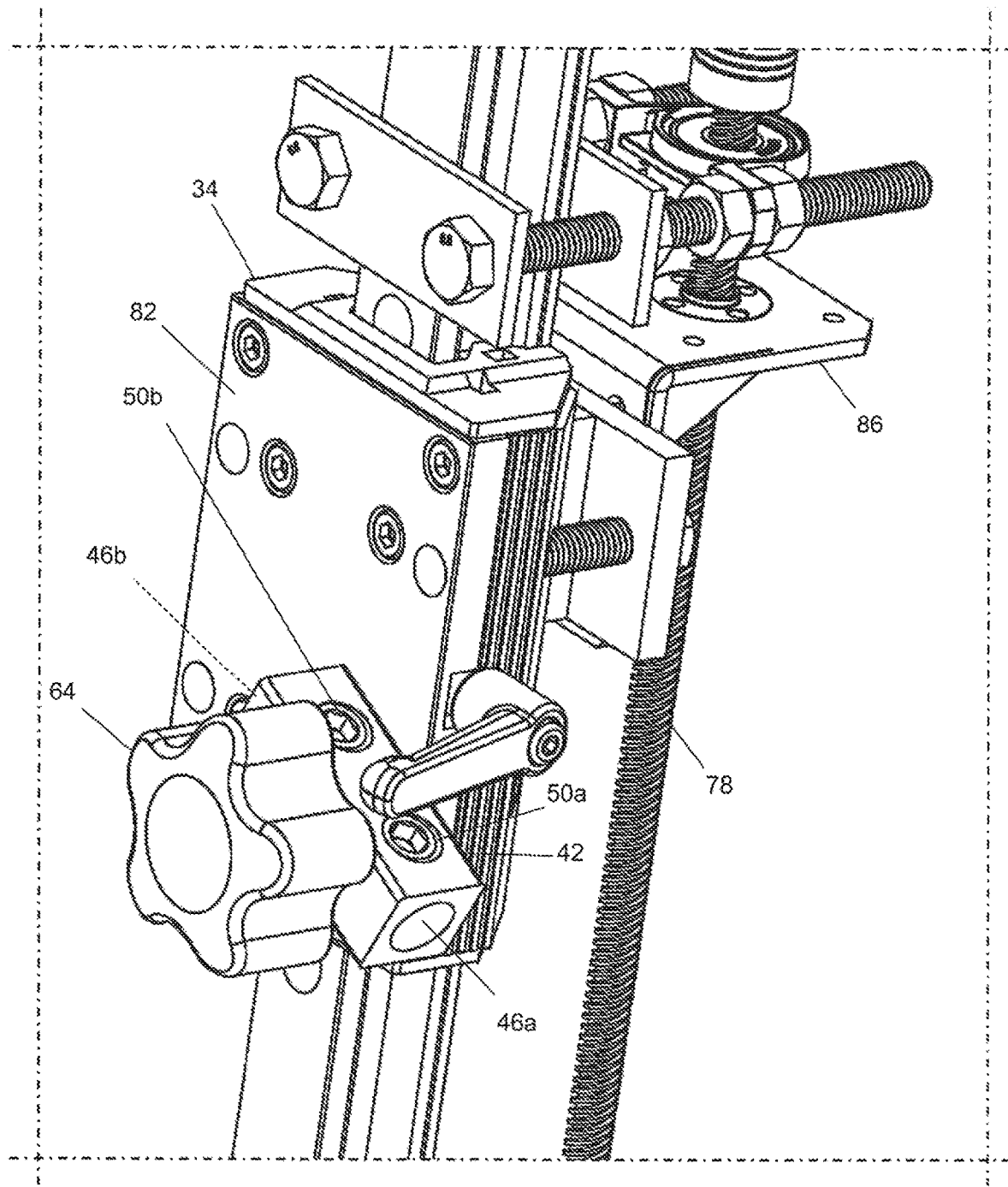
FIG. 7 is a partial, enlarged view of the welding apparatus of FIG. 1 illustrating the pivotable receiver thereof.
Figure 8:
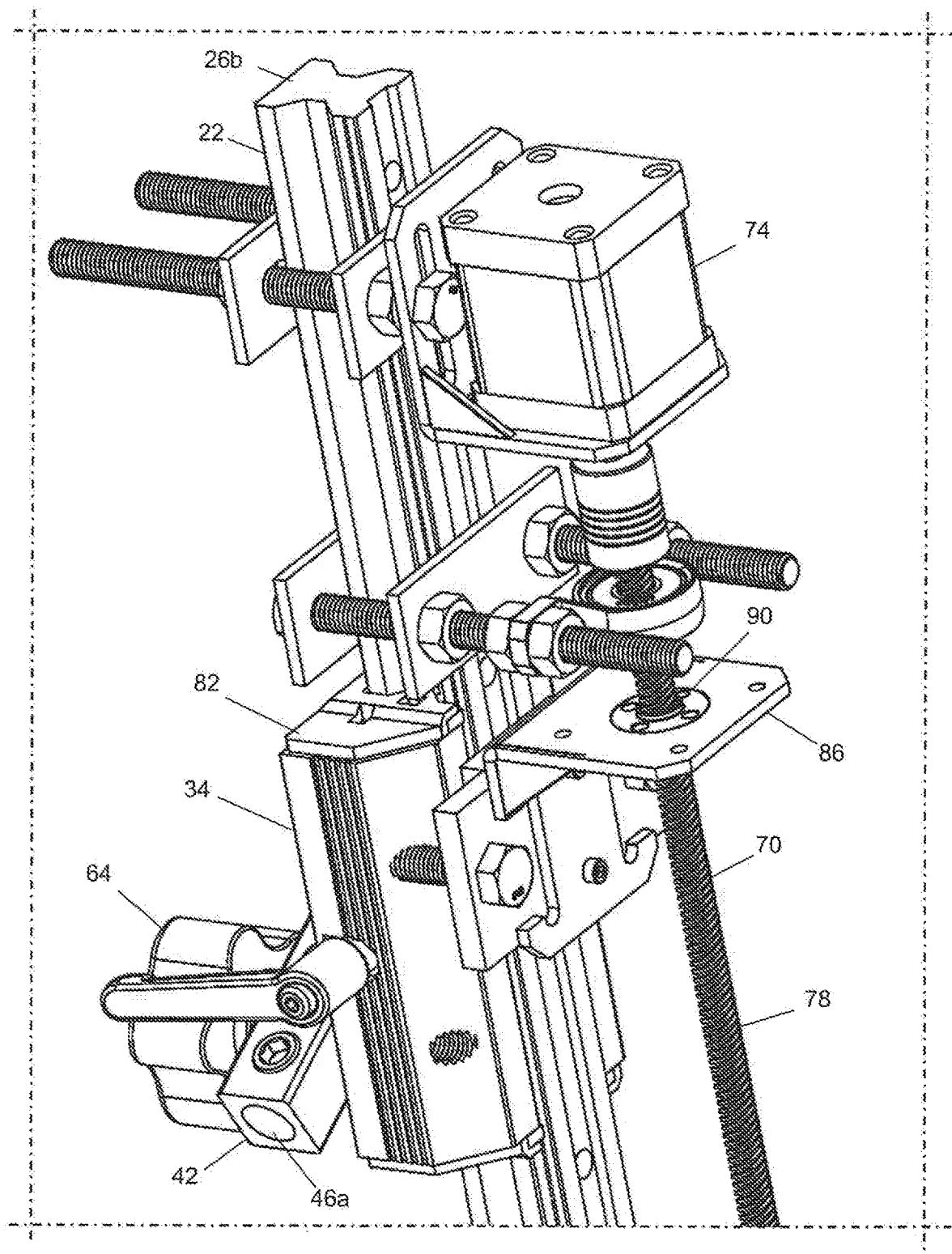
FIG. 8 is a partial, enlarged view of the welding apparatus of FIG. 1 illustrating how the leadscrew of the actuator engages and thereby moves the electrode holder along the arm.

Optionally, receiver 42 can be pivotable such that the angle between electrode 38 and arm 22, and thus workpiece 18, is adjustable (e.g., as represented by arrow 62) (FIG. 5). For example, electrode holder 34 can comprise an adjustment knob 64 that, when loosened, permits (e.g., manual) pivoting of receiver 42 (and thus electrode 38, when coupled thereto) and, when tightened, restricts movement of the receiver. Receiver 42 can thus permit a user to orient electrode 38 relative to workpiece 18 as desired and can maintain that orientation during the welding process. As described in further detail below, such adjustability can permit apparatus 10 to adjust the (e.g., horizontal) travel speed of electrode 38 along workpiece 18. While as shown receiver 42 is manually pivotable, in other embodiments the receiver can be pivoted using any suitable mechanism, such as a motor.

Receiver 42 can define a second receptacle 46b configured to receive a power wire 66 that is coupled to a power source (e.g., 102, not shown) (e.g., a direct current or alternating current power source that, optionally, can provide a constant current) and can have a second set screw 50b. When power wire 66 is received in second receptacle 46b, second set screw 50b, when tightened, can retain the power wire therein and, when loosened, can permit removal of the power wire. And, when power wire 66 and electrode 38 are received by receiver 42, the power wire can place the power source in electrical communication with the electrode. Coupling power wire 66 in this manner can facilitate power delivery to electrode 38 while electrode holder 34 moves relative to arm 22 (described below); the power source need not be directly coupled to the electrode holder. Electrode holder 34 thus need not bear additional weight (e.g., of the power source) that may strain and contribute to wear on the actuator (e.g., 70) that moves the electrode holder.

Electrode holder 34, and thus electrode 38, when coupled thereto, can be movable relative to arm 22 via actuator 70 to facilitate welding and promote improved weld quality. Weld quality can depend, at least in part, on the (e.g., minimum) separation distance between workpiece 18 and electrode 38 (e.g., arc length 94). For example (e.g., for shielded metal arc welding), an improper arc length may result in a weld bead having an uneven surface leading to cold lap (e.g., if the arc length is too short) or excessive spatter and/or porosity with slag that is difficult to remove (e.g., if the arc length is too long). During welding, electrode 38 can be consumed (e.g., melted) such that the electrode shortens and, if the electrode is not moved, the arc length increases. A suitable arc length can be maintained during the welding process to form a consistent weld at least by moving electrode holder 34, e.g., such that the electrode moves toward workpiece 18 to compensate for consumption of the electrode.

Figure 11:
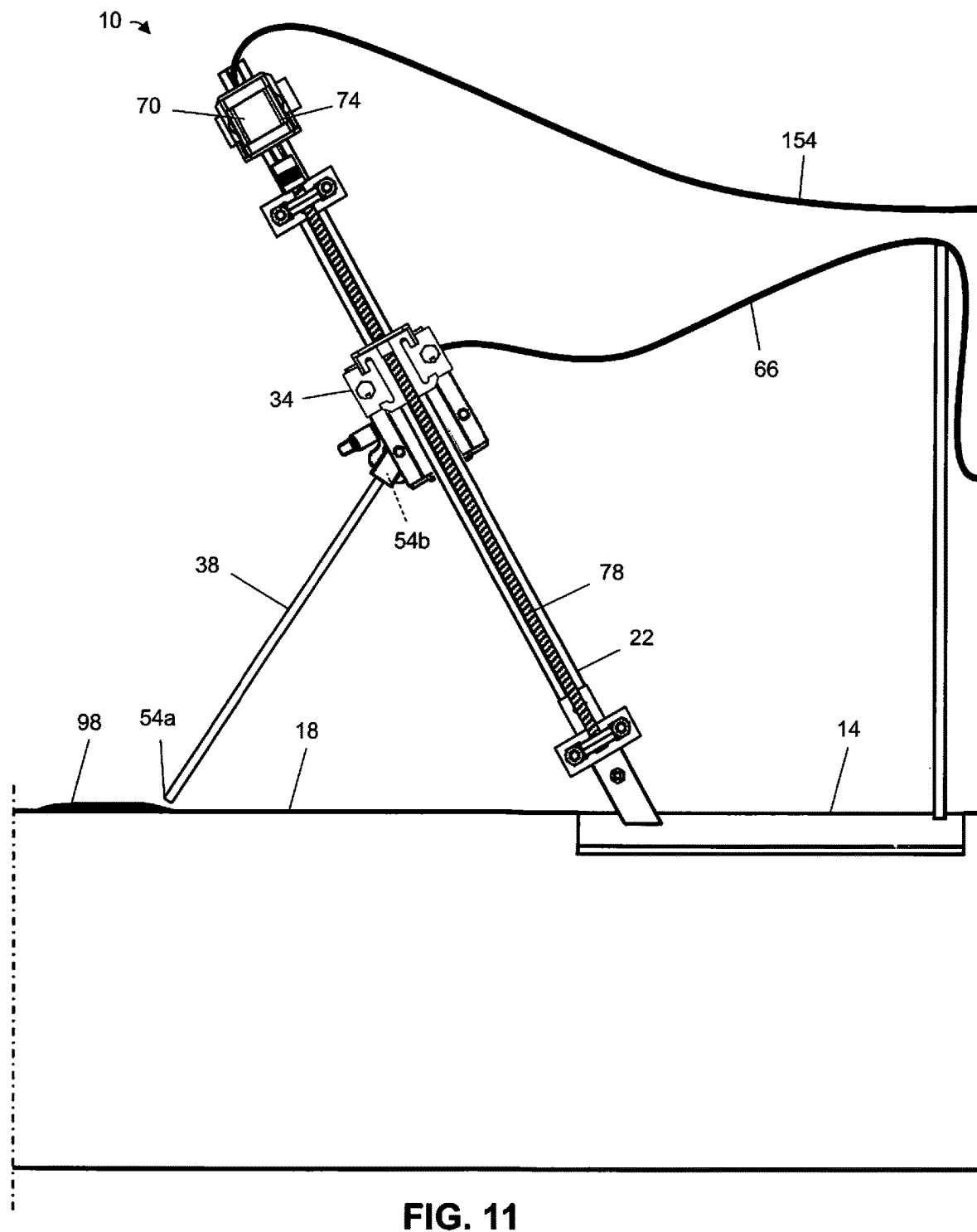
FIGS. 11 and 12 illustrate movement of the electrode holder along the arm to maintain a suitable arc length while the electrode is consumed during welding.
Figure 12:
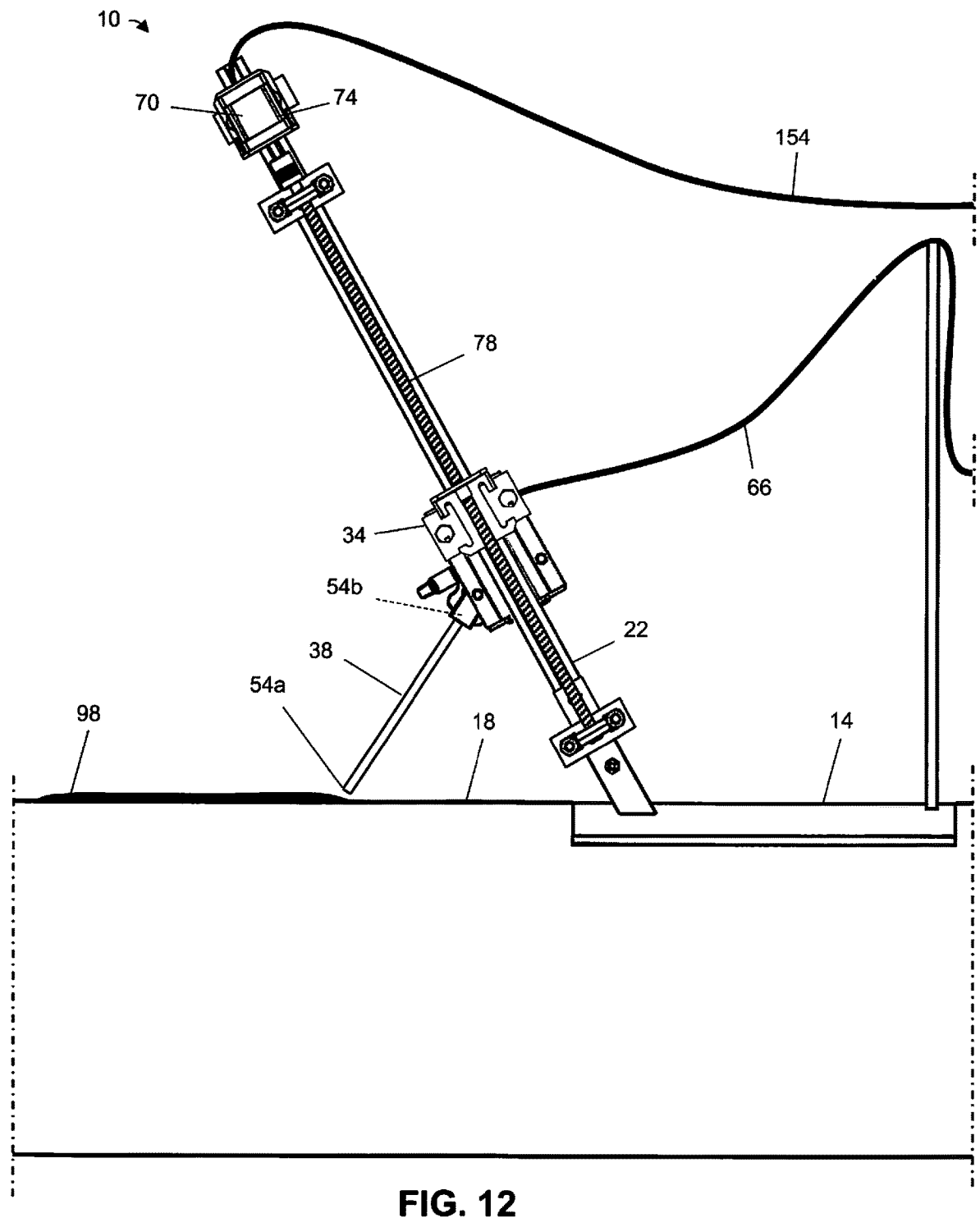

Actuator 70 can comprise any suitable mechanism(s) for moving electrode holder 34 to maintain a suitable arc length 94 between workpiece 18 and electrode 38. For example, actuator 70 can comprise a motor 74 coupled to arm 22 (e.g., closer to second end 26b than to first end 26a) and a leadscrew 78 coupled to the motor and electrode holder 34. Motor 74, when actuated, can rotate leadscrew 78, causing electrode holder 34 to move relative to arm 22 and along the leadscrew. Leadscrew 78, as shown, extends along arm 22 in the first direction such that rotation of the leadscrew causes electrode holder 34 to move along the arm (e.g., along the first direction). For example, electrode holder 34 can comprise a sliding member 82 that is slidably coupled to arm 22 (and, optionally, comprises receiver 42) and a flange 86 that extends outwardly from the sliding member and defines an opening 90. Leadscrew 78 can be disposed in opening 90 such that the leadscrew, when rotated, engages and thereby moves the flange along the leadscrew to slide the sliding member along the arm (FIGS. 9, 11, and 12). Motor 74 can be configured to rotate leadscrew 78 both clockwise and counterclockwise such that electrode holder 34 is movable both toward and away from workpiece 18.

Motor 74 and leadscrew 78 are illustrative mechanisms for moving electrode holder 34; in other embodiments, actuator 70 can comprise any suitable mechanism(s) having any suitable orientation to facilitate such movement. For example, in some embodiments, leadscrew 78 can be angularly disposed relative to arm 22 such that electrode holder 34 is configured to move in a direction different from (e.g., angularly disposed relative to) the first direction, rather than along the arm. In other embodiments, actuator 70 can comprise other mechanisms for moving electrode holder 34 relative to (e.g., along) arm 22, such as, for example, hydraulic actuators, pneumatic actuators, mechanical actuators, electromechanical actuators, and/or the like. And, while actuator 70 as shown is a single degree-of-freedom system (e.g., such that the actuator is configured to move electrode holder 34 along a single direction), the actuator can, in some embodiments, be a multiple degree-of-freedom system (e.g., such that the actuator can move the electrode holder along multiple directions).

Referring particularly to FIGS. 9-12, some of the present methods of making a weld are described below with reference to apparatus 10. Apparatus 10, however, is not limiting on those methods, which can be performed with any suitable system. Nor are the present methods limiting on apparatus 10, which can be used to perform any suitable process.

In some methods, the consumable electrode (e.g., 38) can be coupled to the electrode holder (e.g., 34) and positioned such that the electrode extends toward workpiece (e.g., 18) and away from the arm (e.g., 22) (e.g., as described above). The electrode can be positioned such that the electrode and the workpiece are separated by an initial separation distance (e.g., measured between the workpiece and the first electrode end (e.g., 54a)). For example, the electrode holder can be moved relative to the workpiece and the arm and/or the electrode can be pivoted (e.g., via pivotable receiver (e.g., 42)) such that the desired separation is achieved.

Welding can be performed via an arc welding process, such as, for example, via shielded metal arc welding (SMAW). To initiate a weld, a power source can apply power to the electrode (e.g., via the power wire (e.g., 66)). An initiator (e.g., steel wool, not shown) can be placed between (e.g., and in contact with) the workpiece and the first electrode end to facilitate weld initiation. Additionally or alternatively, the electrode can be brought into contact with the workpiece to initiate the weld, and thereafter can be separated from the workpiece by the initial arc length. Weld initiation can generate an electric arc between, and thereby melt, the electrode and the surface of the workpiece to form a weld pool that solidifies and forms the weld (e.g., 98). The electrode can comprise any suitable electrode, such as, for example, an electrode that has a core coated with a flux covering. As the electrode is consumed, the flux covering can decompose to produce gases that protect the weld area from atmospheric gases and produces slag that floats to the surface of and protects the weld from contamination as the weld solidifies.

Figure 10:
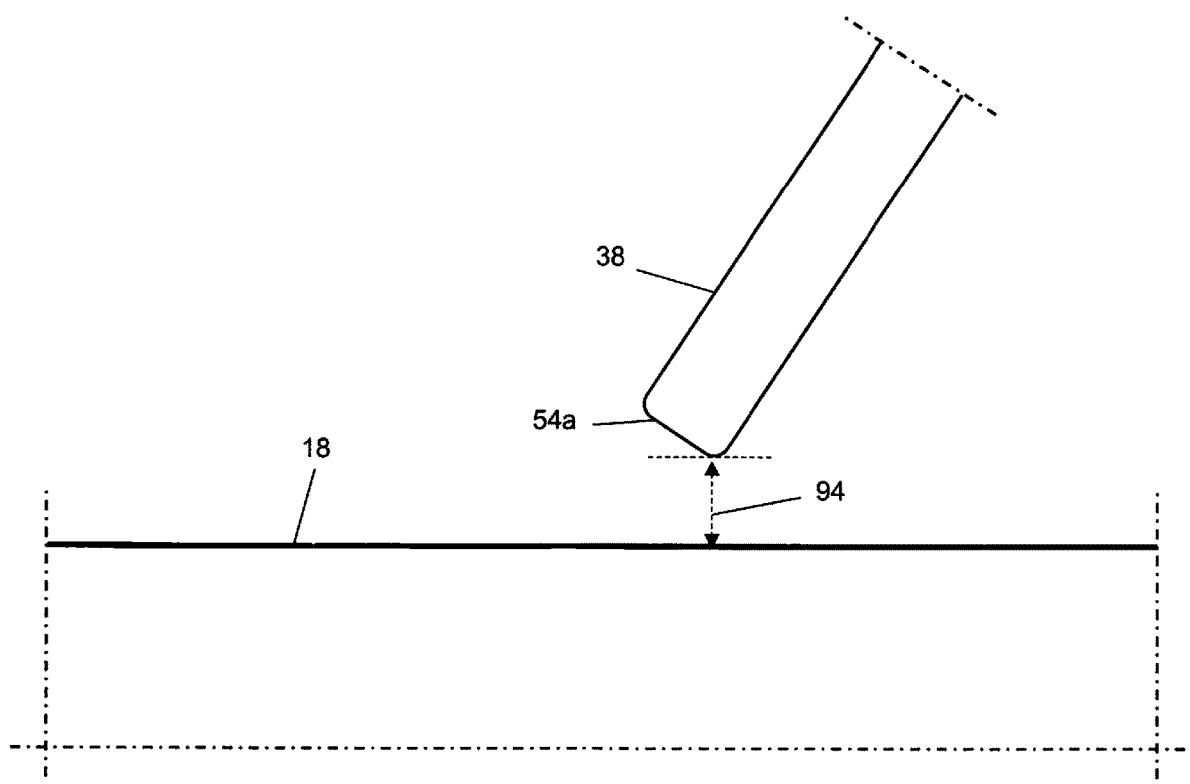
FIG. 10 is a partial, enlarged view showing the separation (e.g., arc length) between the first end of the electrode and the workpiece.

The electrode, as it is consumed, can shorten such that, absent repositioning of the electrode, the arc length between the electrode and the workpiece increases. To compensate for the electrode consumption, the actuator (e.g., 70) of the apparatus can be actuated to move the electrode holder and thus the electrode (e.g., the second electrode end) toward the workpiece (e.g., along the leadscrew (e.g., 78) and/or the arm). A suitable arc length can thus be maintained by moving the electrode holder as the electrode is consumed (FIGS. 10 and 12). For example, in some embodiments, the moving can be performed such that, during the welding, the arc length between the electrode and the workpiece can be maintained within 20% of the initial separation distance, such as, for example, within 20%, 15%, 10%, 8%, 6%, 4%, or less (e.g., within 10%) of the initial separation distance.

Movement of the electrode holder relative to the arm can cause the electrode to travel along the surface of the workpiece to form the weld (e.g., such that the first electrode end moves toward the apparatus). For example, as shown, movement of the electrode holder along the leadscrew and toward the workpiece (and, e.g., the base) can cause the electrode to move from an initial position (FIG. 9) to an end position (FIG. 12) in which the first electrode end is disposed closer to the apparatus (e.g., to the first end of the arm and/or the base) than when in the initial position, as measured along the surface of the workpiece. Such simultaneous vertical and horizontal movement can be achievable due at least in part to the orientations of the electrode, arm, and/or actuator. For example, because the actuator can be configured to move the electrode holder (e.g., along the leadscrew and/or arm) in a direction angularly disposed relative to the workpiece (e.g., in the first direction) and the electrode extends toward the workpiece in a direction angularly disposed relative to the workpiece (e.g., in the second direction), movement of the electrode holder can cause the electrode to travel both horizontally and vertically as the electrode is consumed. Advantageously, such movement is achievable even though the actuator, as shown, is a single degree-of-freedom system. The apparatus can thus provide a simple and cost-effective solution to produce consistent, quality welds.

Apparatus 10 can comprise a controller 106 configured to control the rate at which actuator 70 moves electrode holder 34 relative to arm 22 (and, e.g., workpiece 18), and thereby the rate at which electrode 38 (e.g., second electrode end 54b) moves toward the workpiece.

Due at least in part to such control, apparatus 10 can achieve improved weld quality and can form welds with different electrodes. For example, the rate at which electrode 38 is consumed, and thus shortens, can vary during welding; controller 106 can adjust the travel speed of electrode holder 34 such that the electrode moves toward workpiece 18 at an appropriate rate to compensate for the electrode consumption and to maintain a suitable arc length 94. And, different consumable electrodes (e.g., having different sizes and/or compositions) may having different melting rates; because controller 106 can adjust the travel speed of electrode holder 34 to an appropriate level relative to the consumption rate of electrode 38, apparatus 10 can form welds with different electrodes even if those electrodes are consumed at different rates.

Figure 13:
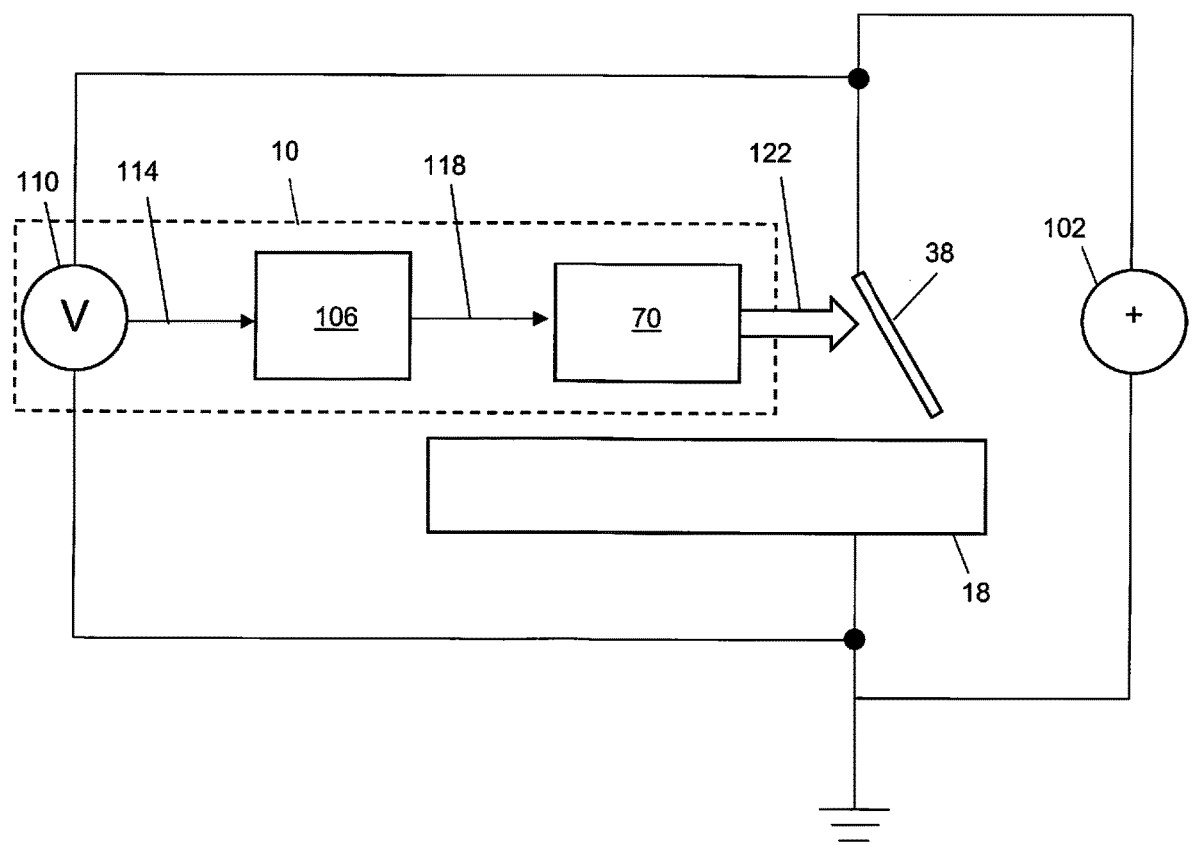
FIG. 13 is a schematic of the welding apparatus of FIG. 1 during use. As shown, a power source is in electrical communication with the electrode and the workpiece and a controller is configured to control the actuator based at least in part on arc voltage measurements.
Figure 14:
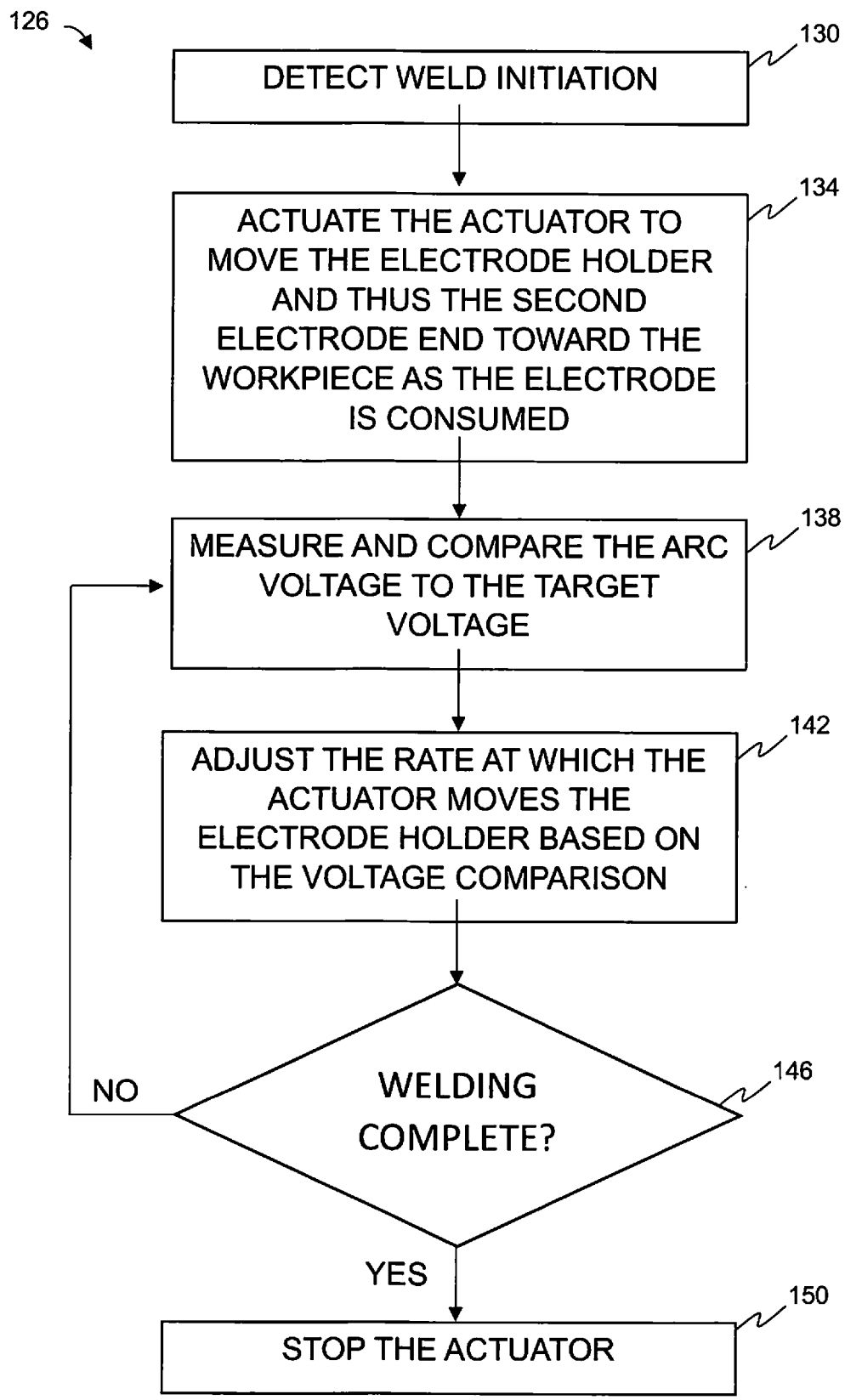
FIG. 14 illustrates steps that the controller in FIG. 13 is configured to perform and that can be performed in some of the present methods.

Referring additionally to FIG. 13, which is a schematic of apparatus 10 when used to make a weld, and FIG. 14, which illustrates steps 126 that controller 106 can be configured to perform (and that can be performed in some of the present methods), controller 106 can be configured to actuate, control, and/or stop actuator 70 (and thereby move and/or stop electrode holder 34 and electrode 38) based at least in part on (e.g., solely on) the arc voltage measured across the electrode and the workpiece. As shown, and as described above, electrode 38 can be in electrical communication with power source 102 which, optionally, can be a constant-current power source. For example, power source 102 can comprise a direct current power source and can be coupled to workpiece 18 such that the electrode is positively charged and the workpiece is negatively charged; in other embodiments, however, the polarity can be reversed, depending on the desired weld properties, or the power source can comprise an alternating current power source. Apparatus 10 can comprise a voltmeter 110 configured to measure the arc voltage across electrode 38 and workpiece 18 and send a signal 114 to controller 106 that is indicative of the measured arc voltage. For example, voltmeter 110 can comprise first and second terminals where, in use, the first terminal is coupled to electrode 38 (e.g., at receiver 42) and a second terminal coupled to workpiece 18 (e.g., to ground) to measure the arc voltage. Apparatus 10 can, in some embodiments, comprise one or more other sensors, such as, for example, an ammeter to detect and/or measure the welding current.

Controller 106 can be configured to perform a step 130 of detecting weld initiation. For example, controller 106 can detect initiation of the welding current (e.g., via an ammeter) and/or application of the arc voltage (e.g., via voltmeter 110). After detecting weld initiation, controller 106 can be configured to (e.g., automatically) perform a step 134 of actuating actuator 70 to move electrode holder 34, and thus electrode 38 (e.g., second electrode end 54b), toward workpiece 18 as the electrode is consumed. Controller 106 can thereby provide immediate control of actuator 70 and electrode holder 34 as welding begins without the need for additional user input.

To control the rate at which electrode 38 (e.g., second electrode end 54b) moves toward workpiece 18, controller 106 can be configured to perform a step 138 of measuring the arc voltage across the electrode and the workpiece (e.g., with voltmeter 110) and comparing the arc voltage to a target voltage. The target voltage can be any suitable voltage for arc welding (e.g., depending at least in part on the type and/or size of electrode 38), such as, for example, greater than or equal to, or between any two of, 18 V, 20 V, 22 V, 24 V, 26 V, 28 V, 30 V, 32 V, 34 V, or higher. Controller 106 can be configured to perform a step 142 of adjusting the rate at which actuator 70 moves electrode holder 34 (e.g., toward workpiece 18) based at least in part on the voltage comparison. For example, controller 106 can send a control signal 118 to actuator 70 (e.g., to motor 74) (e.g., wirelessly and/or via umbilical 154 (FIG. 9)) to adjust the actuation rate thereof (e.g., the speed at which the motor rotates leadscrew 78).

Because the arc voltage can depend, at least in part, on arc length 94, controlling actuator 70 and electrode holder 34 based on the arc voltage can permit apparatus 10 to maintain a suitable arc length during welding. To illustrate, the rate at which electrode 38 (e.g., second electrode end 54b) moves toward workpiece 18, as compared to the rate at which the electrode shortens, can affect the arc length and thus arc voltage during welding. If the rate of electrode movement is too low, the separation between electrode 38 and workpiece 18 may increase, thereby increasing arc length 94 and arc voltage. If the rate of electrode movement is too high, the separation between electrode 38 and workpiece 18 may decrease, thereby decreasing arc length 94 and arc voltage. Thus, if controller 106 determines that the measured arc voltage exceeds or is less than the target voltage, the controller can be configured to increase (e.g., if the arc voltage exceeds the target voltage) or decrease (e.g., if the arc voltage is less than the target voltage) the rate at which actuator 70 moves electrode holder 34, and thus electrode 38 (e.g., second electrode end 54b), as represented by arrow 122, toward workpiece 18 such that the arc voltage approaches the target voltage (e.g., to adjust arc length 94 to a length that is closer to the initial separation distance). Controller 106 can use any suitable control system to control actuator 70, such as, for example, proportional-integral-derivative control, and can, but need not, rely solely on the comparison of the arc voltage measurements to the target voltage (e.g., without consideration of other measurements) to implement such control. For initial testing, an Arduino® (Corso San Gottardo 6A, Chiasso, CH 6830) Nano controller which uses an ATmega328 microcontroller was used successfully. As will be appreciated by those skilled in the art, other and more sophisticated and more powerful controllers may also be used.

Through the operation of actuator 70, a suitable arc length 94 can be maintained without the need for a thick coating on electrode 38 (e.g., as is required for gravity welding). Thus, in some of the present methods, welding can be performed (e.g., with apparatus 10) using comparatively smaller electrodes (e.g., to permit welding of thinner workpieces). For example, welding can be performed with an electrode having a diameter less than or equal to 0.25 inches (in.), such as, for example, less than or equal to or between any two of 0.20-in., 0.18-in., 0.16-in., 0.14-in., 0.12-in., 0.10-in., or smaller (e.g., less than or equal to 0.1875 inches). Typical electrode diameters are 3/16-in., 5/32-in., 1/8-in., 3/32-in., and occasionally 1/16-in. As will be appreciated by those skilled in the art, smaller electrode diameters (e.g., diameter less than 5/32-in.) may lack sufficient rigidity to be effectively controlled.

Controller 106 can be configured to perform a step 146 of determining if welding is complete. Controller 106 can make the determination based on any suitable criteria, such as, for example, whether a welding current is detected, an arc voltage is applied, electrode holder 34 has traveled a predetermined distance, and/or the like. If welding is not complete, controller 106 can continue to control actuator 70 to maintain a suitable arc length 94 (e.g., based on the arc voltage). If welding is complete, controller 106 may perform a step 150 of (e.g., automatically) stopping actuator 70 and thus movement of electrode holder 34 and electrode 38. As will be appreciated by those skilled in the art, electrode diameter becomes a problem under 5/32-in. as lack of rigidity may affect control.

Some of the present methods can comprise performing any of the above-described steps (e.g., 130, 134, 138, 142, 146, 150). Such methods can be performed with apparatus 10 or with any other suitable welding apparatus. For example, some methods can comprise moving the electrode (e.g., the second electrode end) toward the workpiece at least by, as the electrode is consumed, actuating an actuator of the welding apparatus to move the electrode holder toward the workpiece and adjusting the rate of such movement based at least in part on an arc voltage measured across the electrode and the workpiece, regardless of whether the welding apparatus comprises the above described base, arm, motor, leadscrew, and/or the like.

The (e.g., horizontal) travel speed of electrode 38 along workpiece 18 can depend, at least in part, on angle 58 between the workpiece and the electrode. The horizontal electrode travel speed required to maintain a suitable arc length can be comparatively faster for a smaller (e.g., less steep) angle 58 and can be comparatively slower for a larger (e.g., steeper) angle 58. Thus, because controller 106 operates to maintain a suitable arc length between electrode 38 and workpiece 18, changing angle 58 (e.g., by pivoting receiver 42) can increase (e.g., if angle 58 decreases) or decrease (e.g., if angle 58 increases) the travel speed of the electrode along the workpiece. The travel speed of electrode 38 along workpiece, and thus angle 58, can affect weld characteristics. For example, because heat input during welding is inversely proportional to the electrode travel speed, a lower heat input can be achieved when angle 58 is comparatively smaller and a higher heat input can be achieved when angle 58 is comparatively larger. And, changing angle 58 can increase (e.g., if angle 58 is decreased) or decrease (e.g., if angle 58 is increased) the length of the weld (e.g., as measured in the horizontal travel direction) and decrease (e.g., if angle 58 is decreased) or increase (e.g., if angle 58 is decreased) the width of the weld. Angle 58 can be selected before the welding (e.g., by pivoting receiver 42) based on the desired weld characteristics and can be maintained as the weld is made.

The automated operation of apparatus 10 can promote weld repeatability and operator safety. Through the operation of actuator 70 and controller 106, apparatus 10 can maintain a suitable arc length 94 between electrode 38 and workpiece 18 with increased consistency over manual welding. Apparatus 10 can thus produce multiples welds of substantially the same quality with greater consistency, as compared to manual welding and gravity welding. Such repeatability can be desirable, for example, for experimental purposes, e.g., to simulate and evaluate welding of high-risk workpieces (e.g., thin-wall, pressurized pipes containing flammable gas and/or liquid). And, because apparatus 10 can be operated remotely, welds can be formed while an operator is positioned safely away from the welding site. For example, if used to weld a pipe containing flammable gas and/or liquid, apparatus 10 may be used to weld the pipe while the operator is positioned in a remote area such that the risk of harm to the operator (e.g., due to an inadvertent explosion during the welding process) is reduced.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A shielded metal arc welding apparatus comprising:
   a base;
   an arm having opposing first and second ends, wherein:
      the first end is coupled to the base; and
      the arm forms an angle with the base of between greater than zero to 90 degrees;
   an electrode holder coupled to the arm and configured to removably couplably receive a shielded metal arc welding electrode; and
   an actuator configured to move the electrode holder relative to the arm; wherein the base is configured to be placed relative to a workpiece such that:
      the second end of the arm is disposed further from the workpiece than is the first end; and
      an electrode, when coupled to the electrode holder, extends from the electrode holder toward the workpiece and forms an angle with the workpiece of between greater than zero to about 130 degrees.

2. The welding apparatus of claim 1, wherein the actuator comprises:
   a motor operatively coupled to the arm; and a leadscrew operatively coupled to the motor and operatively coupled to the electrode holder such that, when the motor is actuated, the leadscrew rotates to move the electrode holder along the leadscrew and relative to the arm.

3. The welding apparatus of claim 2, wherein:
the leadscrew extends along the arm; and
the electrode holder comprises:
   a sliding member slidably coupled to the arm; and
   a flange, the flange extending outwardly from the sliding member and defining an opening;
wherein the leadscrew is disposed in the opening such that, when the leadscrew rotates, the leadscrew engages and thereby moves the flange along the leadscrew to slide the sliding member along the arm.

4. The welding apparatus of claim 1, wherein the electrode holder comprises a receiver that is configured to removably couplably receive the electrode and is pivotable such that, when the electrode is received by the receiver, an angle between the electrode and the arm is adjustable.

5. The welding apparatus of claim 1, comprising a controller configured to adjust a rate at which the actuator moves the electrode holder relative to the arm.

6. The welding apparatus of claim 5, comprising a voltmeter configured to measure an arc voltage across an electrode and the workpiece, wherein the controller is configured to adjust the rate at which the actuator moves the electrode holder relative to the arm based at least in part on the arc voltage.

7. The welding apparatus of claim 6, wherein the controller is configured to adjust the rate at which the actuator moves the electrode holder relative to the arm based solely on a comparison of the arc voltage with a target voltage.

8. The welding apparatus of claim 5, wherein the actuator comprises:
a motor operatively coupled to the arm; and
a leadscrew operatively coupled to the motor and operatively coupled to the electrode holder such that, when the motor is actuated, the leadscrew rotates to move the electrode holder along the leadscrew relative to the arm; and wherein
the controller is configured to adjust the rate at which the actuator moves the electrode holder along the arm at least by adjusting a speed at which the motor rotates the leadscrew.

9. The welding apparatus of claim 5, wherein the controller is configured to:
detect initiation of a weld; and
in response to detecting initiation of a weld, actuate the actuator and adjust the rate at which the actuator moves the electrode holder relative to the arm.

10. The welding apparatus of claim 1, wherein:
the workpiece is a pipe;
the base is coupled to the pipe; and
an electrode is coupled to the electrode holder.

11. A method of making a shielded metal arc weld, the method comprising:
coupling a shielded metal arc welding electrode extending between first and second electrode ends to an electrode holder of a shielded metal arc welding apparatus;
positioning the electrode such that:
   the electrode extends from the electrode holder toward a workpiece;
   the first electrode end is disposed closer to the workpiece than is the second electrode end; and
   the electrode forms an angle with the workpiece of between greater than zero to about 130 degrees;

applying power to the electrode to initiate welding;
moving the second electrode end toward the workpiece at least by, as the electrode is consumed, actuating an actuator of the welding apparatus to move the electrode holder toward the workpiece; and
adjusting a rate at which the actuator moves the electrode holder toward the workpiece based at least in part on an arc voltage measured across the electrode and the workpiece.

12. The method of claim 11, wherein the adjusting is based solely on a comparison of the arc voltage with a target voltage.

13. The method of claim 11, wherein:
positioning the electrode is performed such that the first electrode end is separated from the workpiece by an initial separation distance; and
the moving and adjusting is performed such that, during the welding, an arc length measured between the electrode and the workpiece is maintained within 10% of the initial separation distance.

14. The method of claim 11, wherein:
the welding apparatus comprises:
a base; and
an arm extending between first and second ends, the first end coupled to the base; and
the method comprises positioning the base relative to the workpiece such that:
   the arm extends in a first direction angularly disposed relative to the workpiece; and
   the second end is disposed further from the workpiece than is the first end.

15. The method of claim 14, wherein:
the actuator comprises:
   a motor operatively coupled to the arm; and
   a leadscrew operatively coupled to the motor and operatively coupled to the electrode holder such that the leadscrew extends along the arm in the first direction; and
actuating the actuator comprises actuating the motor such that the leadscrew rotates and thereby moves the electrode holder along the arm and the leadscrew.

16. The method of claim 11, wherein positioning the electrode comprises pivoting the electrode holder such that the electrode pivots from a first position in which the electrode is angularly disposed relative to the workpiece at a first angle to a second position in which the electrode is angularly disposed relative to the workpiece at a second angle different from the first angle.

17. The method of claim 11, wherein the workpiece comprises a pipe.

18. A shielded metal arc welding apparatus comprising:
an electrode holder configured to couplably receive and position a shielded metal arc welding electrode that extends between first and second electrode ends such that the first electrode end is disposed closer to a workpiece than is the second electrode end;
an actuator configured to move the electrode holder toward the workpiece such that;
   when a shielded metal arc electrode is coupled to the electrode holder, the second electrode end moves toward the workpiece; and
   the shielded metal arc electrode forms an angle with the workpiece of between greater than zero to about 130 degrees; and
a controller configured to adjust a rate at which the actuator moves the electrode holder toward the workpiece based at least in part on an arc voltage measured across the electrode and the workpiece.

19. The welding apparatus of claim 18, wherein the controller is configured to adjust the rate at which the actuator moves the electrode holder toward the workpiece based solely on a comparison of the arc voltage with a target voltage.

20. The welding apparatus of claim 18, wherein:
the electrode holder is configured to position the electrode such that the first electrode end is separated from the workpiece by an initial separation distance; and
the controller is configured to adjust the rate at which the actuator moves the electrode holder toward the workpiece such that, during welding, an arc length measured between the electrode and the workpiece is maintained within 10 percent of the initial separation distance.

21. The welding apparatus of claim 1, wherein the electrode forms an angle with the workpiece of up to about 90 degrees.

22. The welding method of claim 11, wherein the electrode forms an angle with the workpiece of up to about 90 degrees.

23. The welding apparatus of claim 18, wherein the electrode forms an angle with the workpiece of up to about 90 degrees.

* * * * *